March 2, 1948.                N. LESTER                2,436,869
                    INJECTION MOLDING MACHINE SPREADER
                        Filed March 29, 1945

INVENTOR.
NATHAN LESTER
BY
Oberlin & Limbach
ATTORNEYS

Patented Mar. 2, 1948

2,436,869

UNITED STATES PATENT OFFICE 2,436,869

INJECTION MOLDING MACHINE SPREADER

Nathan Lester, Shaker Heights, Ohio, assignor to Lester Engineering Company, Cleveland, Ohio, a corporation of Ohio Application March 29, 1945, Serial No. 585,458

4 Claims. (Cl. 18—30)

The present improvements, relating as indicated to injection molding machines, have more particular regard to the element in such machines known as a spreader, or more familiarly referred to in the art as a "pineapple" or "torpedo."

As is well understood, such spreader element is inserted in the pressure cylinder in order to assist in effecting the uniform and efficient heating of the plastic material as it passes through such pressure cylinder. To this end the element is designed so as in the first place to provide an additional source of heat and in the second place to spread the material and thus render it more susceptible to the heating action both of the element and of the cylinder walls.

In my pending application filed March 20, 1944, Serial No. 527,206, now Patent No. 2,428,315, I disclose an improved construction of such spreader element which is designed to offer a minimum resistance to the flow of material through the passages which it forms within the cylinder and at the same time is sufficiently strong to withstand the relatively high pressures, on the order of 30,000 lbs. per square inch to which it is subjected in the pressure cylinder. The present improvements, while retaining the advantageous features of such previous construction of spreader, provide in addition for the better incorporation therein of the necessary heating element and of thermostatic means for controlling such heating element so as to insure the uniform heating of the plastic material as it is injected from the pressure cylinder.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 3:
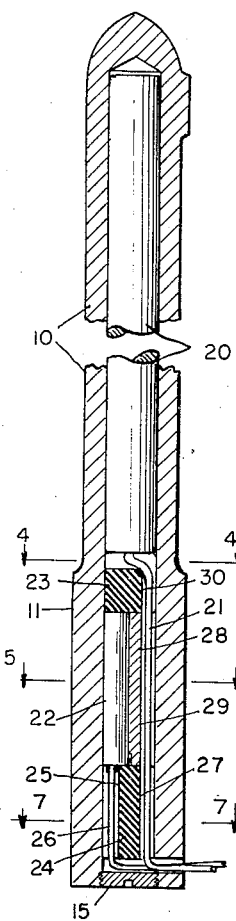
Figure 4:
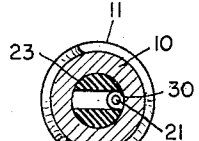
Figure 5:
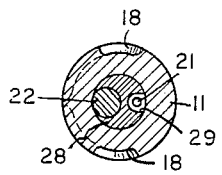
Figure 6:
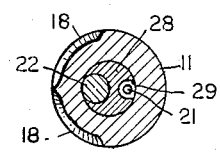
Figure 7:
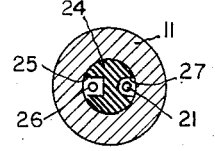
Figure 1:
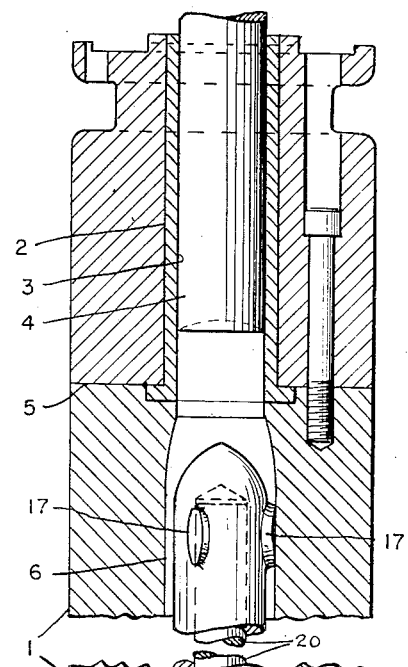
Fig. 1 is a central sectional view of an injection molding cylinder in which is incorporated a spreader element embodying my present improved construction, such element appearing in side elevation.
Figure 1:
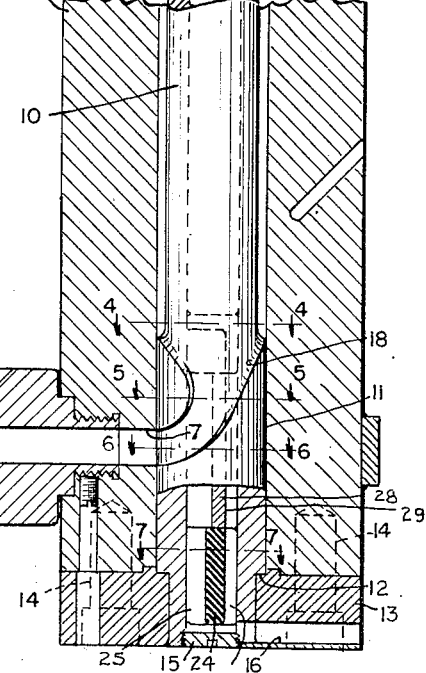
Figure 2:
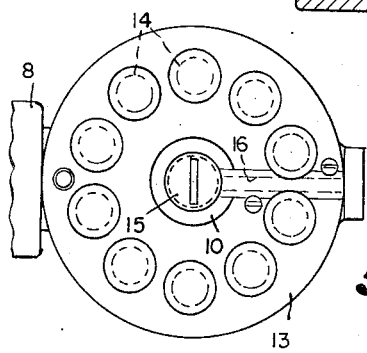
Fig. 2 is a bottom end view of such cylinder.

Fig. 3 is a central section of the spreader element removed from the pressure cylinder; and Figs. 4, 5, 6 and 7 are transverse sectional views of such spreader element, the planes of the sections being indicated by the lines 4—4, 5—5, 6—6 and 7—7 on Fig. 1, and by corresponding lines on Fig. 3.

The body 1 of the injection cylinder shown in Fig. 1 is of the type and construction suitable for incorporation in an injection molding machine such as that shown and described in my prior U. S. Patent No. 2,262,615, dated November 11, 1941. Such cylinder it will be seen has an upper bore portion 2 fitted with a liner 3 in which a solid plunger 4 is adapted to reciprocate. The body 1 is preferably transversely divided on a plane 5 to permit the ready insertion and removal of the cylinder lining 3, as occasion may require. Continuous with the bore 2 is an enlarged bore portion 6 which extends to the lower end of the cylinder body, the latter being provided adjacent such end with a lateral opening 7 through which the plastic material being operated on may be ejected under pressure of the plunger 4 into a discharge nozzle 8 equipped with a nozzle fitting 9.

The spreader of present interest is a hollow body of general cylindrical form located in the enlarged portion 6 of the bore in pressure cylinder 1 and comprises a cylindrical shank portion 10, the outer diameter of which is smaller than the diameter of such bore, and a head portion 11 which is of substantially the same diameter as such bore so as to closely fit within the same. As clearly shown in Fig. 1, the head portion of the spreader extends from a point some distance above the lateral discharge opening 7 in the cylinder body to a point beyond the lower end of such body. On a plane coincident with such lower end the diameter of the head is somewhat reduced to provide a shoulder 12 against which seats the inner edge of an annular plate 13 detachably secured to the lower end of the chamber as by set bolts 14. However, it will be observed that the lower end of the spreader extends through such plate so that access may be had to the hollow interior thereof, as will be presently described. The lower end of the spreader is normally closed by a threaded plug 15. Plate 13 is furthermore provided with a transverse radial passage 16 which communicates with such hollow interior of the spreader.

The inner or upper end of the spreader is of bullet shape or prolate form, and adjacent such end radially projecting lugs 17, three as shown, are provided on the spreader in order to retain such end and the shank portion of the spreader as a whole in proper concentric relation to the bore 6 of the cylinder. Two passages or channels 18 are also provided in the head portion 11 of the spreader whereby the plastic material after being forced under pressure through the annular space provided between the shank portion 10 of such spreader and bore 6 may be discharged through opening 7. The construction of such passages is substantially as described in my pending application Serial No. 527,206, now Patent No. 2,428,315. In other words, the upper end of each extends approximately 180° around the periphery of head portion 11 but narrows in width as the passage curves downwardly towards discharge opening 7. At the same time the radial depth of the passage which at its upper end is substantially equal to that of the annular space between spreader portion 10 and the bore 6 gradually becomes greater as the passage approaches the discharge opening 7 so as properly to accommodate the flow of material as it converges into such opening.

As best shown in Fig. 3, the spreader is cored from its lower end, normally closed as previously described by plug 15, to a point adjacent its upper prolate end. Fitted in the hollow space thus provided within portion 10 of the spreader is an electrical heating unit in the form of a removable cylindrical cartridge 20, the lead wires 21 to which are carried downwardly to the lower end of head portion 11 and thence laterally out through radial passage 16 in closure plate 13.

Mounted in the hollow interior of head portion 11 of the spreader is a thermostatic switch 22, likewise of cartridge form, such switch being positioned longitudinally of the head by means of two filler blocks 23 and 24 of insulating material. The lower such block 24 is formed with a groove 25 which provides a passage for lead wires 26 to said switch, such wires thence extending outwardly through radial passage 16 in plate 13, along with the lead wires 21 to the heating unit, said block 24 being formed with a second groove 27 to accommodate the latter.

Interposed between the blocks 23 and 24 is a metal filler block 28 which is so formed as to hold the switch 22 against the forward face of the bore within the spreader head 11, i. e. the face directed toward the discharge opening 7 in cylinder 1 when the spreader is properly mounted within the latter. A groove 29 in said block 28 and a similar groove 30 in block 23 are disposed in alignment with the groove 27 to provide a continuous passage for the lead wires 21 to the heating unit.

From the foregoing description it will be seen that the thermostatic switch is located so as to be affected as direct as possible by the temperature of the passing material at the point where it is discharged from pressure cylinder 1 into nozzle 8. Accordingly, by suitably connecting the lead wires to such switch with suitable electrical control means, the electric current supplied to the heating unit may be automatically varied so that the discharged material will be just the right temperature for the molding operation. The interior construction of the spreader, furthermore, is such that access may be readily had to both such heating unit and thermostatic control switch without removing the spreader from the pressure cylinder. At the same time all of the advantageous features of my previous construction of the spreader, whereby the smooth unimpeded flow of heated plastic material from the pressure cylinder to the discharge nozzle is insured, are retained.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with the injection cylinder of a pressure molding machine, such cylinder having a lateral discharge opening adjacent one end thereof, of a spreader comprising a head closely fitted within such cylinder end and extending to a point beyond such opening and a shank of smaller diameter than the bore of said cylinder projecting from said head into the latter, said head being formed with a channel leading from the space between said shank and cylinder bore to such discharge opening, an electrical heating unit housed within the shank portion of said spreader, a thermostatic switch for controlling said unit housed within the head portion of said spreader, a block of insulating material interposed between said switch and the adjacent end of said heating unit and formed with a groove longitudinally thereof, a filler block formed with a groove in which said thermostat is disposed and another groove in alignment with the groove in said block of insulating material, and a second block of insulating material interposed between the head end of said spreader and the switch and formed with two grooves in alignment with those of said filler block, such aligned grooves in said blocks providing for passage of leads from the head end of said spreader to said heating unit and to said switch respectively.

2. The combination with the injection cylinder of a pressure molding machine, said cylinder having a lateral discharge opening adjacent one end thereof, of a spreader comprising a head closely fitted within such cylinder end and extending to a point beyond such opening and a shank of smaller diameter than the bore of said cylinder projecting from said head into the latter, said head being formed with a channel leading from the space between said shank and cylinder bore to such discharge opening, an electrical heating unit housed within the shank portion of said spreader, a thermostatic switch for controlling said unit housed within the head portion of said spreader, a block of insulating material interposed between said switch and the adjacent end of said heating unit and formed with a groove longitudinally thereof, a filler block formed with a groove in which said thermostat is disposed and another groove in alignment with the groove in said block of insulating material, and a second block of insulating material interposed between the head end of said spreader and the switch and formed with two grooves in alignment with those of said filler block, said head being formed with a lateral bore in communication with both of the grooves in said second block of insulating material, such aligned grooves in said blocks and such lateral bore in said head providing for passage of leads from the head end of said spreader to said heating unit and to said switch respectively.

3. The combination with the injection cylinder of a pressure molding machine, such cylinder having a lateral discharge opening adjacent one end thereof, of a spreader comprising a head closely fitted within such cylinder end and extending to a point beyond such opening and a shank of smaller diameter than the bore of said cylinder projecting from said head into the latter, said head being formed with a channel leading from the space between said shank and cylinder bore to such discharge opening, an electrical heating unit housed within the shank portion of said spreader, a thermostatic switch for controlling said unit housed within the head portion of said spreader, a block of insulating material interposed between said switch and the adjacent end of said heating unit and formed with a groove longitudinally thereof, a filler block formed with a groove in which said thermostat is disposed and another groove in alignment with the groove in said block of insulating material, and a second block of insulating material interposed between the head end of said spreader and the switch and formed with two grooves in alignment with those of said filler block, said head being formed with a lateral bore in communication with both of the grooves in said second block of insulating material, such aligned grooves in said blocks and such lateral bore in said head providing for passage of leads from the head end of said spreader to said heating unit and to said switch respectively, said head being further provided with a continuous shoulder disposed between the lateral discharge opening in such cylinder and the lateral bore in said head and in sealing contact with such cylinder.

4. The combination with the injection cylinder of a pressure molding machine, such cylinder having a lateral discharge opening adjacent one end thereof, of a spreader comprising a head closely fitted within such cylinder end and extending to a point beyond such opening and a shank of smaller diameter than the bore of said cylinder projecting from said head into the latter, said head being formed with a channel leading from the space between said shank and cylinder bore to such discharge opening, an electrical heating unit housed within the shank portion of said spreader, and successively arranged insulating and filler blocks in said head each formed with a groove defining in part a passage for leads to said heating element, said filler block being formed with a second groove therein disposed on the side of said head nearest to such discharge opening in said cylinder, and a thermostatic switch in such second groove of said filler block.

NATHAN LESTER.

REFERENCES CITED

The following references are of record in the file of this patent:

UNITED STATES PATENTS

| Number | Name | Date |
| --- | --- | --- |
| 2,201,703 | Sage | May 21, 1940 |
| 2,202,140 | Burroughs | May 28, 1940 |
| 2,333,207 | Smith | Nov. 2, 1943 |
| 2,372,833 | Jabst | Apr. 3, 1945 |